Aug. 30, 1955  C. J. H. STEVENS  2,716,672
SEALING GLANDS
Filed July 22, 1952
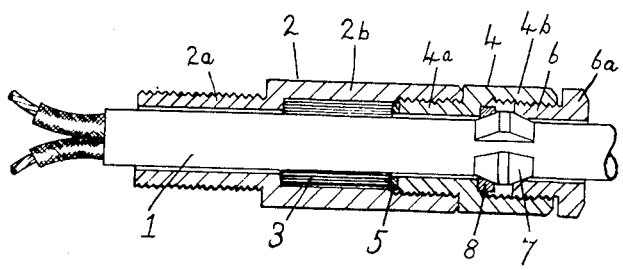
FIG. I.
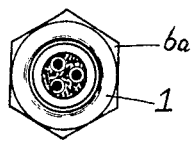
FIG. 2.
Inventor:
C. J. H. Stevens
By John A. Seifert
Attorney

United States Patent Office 2,716,672
Patented Aug. 30, 1955

2,716,672
SEALING GLANDS

Charles James Henry Stevens, Welling, England, assignor to Johnson and Phillips Limited, London, England, a British company.

Application July 22, 1952, Serial No. 300,265

4 Claims. (Cl. 174—77)

This invention relates to sealing glands, and refers particularly to sealing glands for use on electric cables which are sheathed with a metal covering say of aluminum. Such sealing glands are employed for bonding and terminating such electric cables.

The object of the invention is the provision of an improved gland for this purpose.

The invention consists broadly of a sealing gland for use on metal sheathed electric cables or the like, comprising a tubular surround and packing material adapted to be pressed into the clearance between said surround and the cable sheath or the like, and thereby form a seal between the inner periphery of said surround and the outer periphery of said sheath or the like, a split bushing and means to cause said split bushing to grip the sheath or the like and thereby tightly bond the gland to said sheath or the like.

In order that the invention may be the more clearly understood a sealing gland in accordance therewith will now be described, reference being made to the accompanying drawings wherein:

Figure 1 is a sectional side elevation of said gland applied to a sheathed electric cable; and Figure 2 is an end view of the same.

Referring to the drawings the gland comprises three tubular metal parts which are adapted to surround the cable sheath 1. The first part 2 is stepped, comprising a portion 2a of smaller diameter, which fits fairly closely on the cable sheath 1, and a portion 2b of larger diameter which affords a clearance between itself and the sheath. In this clearance is inserted a resilient packing 3 which could be of the material known under the registered trademark "Neoprene."

The second gland part 4 is stepped like the first. The smaller portion 4a thereof is externally screw threaded and is screwed into the end of the larger portion 2b of the first gland part 2, which is internally screw threaded for that purpose. In this way the resilient packing 3 is compressed endwise and accordingly forms a waterproof and flameproof seal between the cable sheath 1 and the inner periphery of the said larger portion 2b of the first gland part 2. The end of the resilient packing is fitted with a metal washer 5 to protect the packing from damage by the end of said second gland part.

The third gland part 6 is of simple tubular form with a nut 6a formed at its end. It is screwed into the larger portion 4b of the second gland part 4 and thereby, by a wedge action, it causes a split metal bushing 7 within said larger portion 4b to be clamped tightly onto the cable sheathing 1. To this end said metal bushing 7 has its outer surface convexly coned at each end as clearly shown. The end of the third gland part 6 has its inner surface correspondingly concavely coned, and a metal washer 8 within said larger portion 4b of the second gland part, and abutting against the shoulder between the larger and smaller portions 4b and 4a of said second gland part 4, also has its inner surface correspondingly concavely coned. The convex cones of the split metal bushing 7 fit in the concave cones of said washer 8 and third gland part 6, and thus the wedge action for clamping the split bushing on the cable sheath 1 is obtained. Instead of employing a separate washer 8, the shoulder itself between the two portions 4b and 4a of the second gland part could be concavely coned.

It will be seen that the gland is tightly bonded to the cable sheath by the split bushing 7, and, at the same time, an entirely separate waterproof and flameproof seal between the gland and the cable sheath is effected by the resilient packing 3.

The smaller portion 2a of the first gland part 2 is externally screw threaded so that the gland can be secured to a desired piece of apparatus. Alternatively said first gland part 2 could constitute an integral part of such apparatus.

It will be seen that the gland is capable of accommodating considerable variation in the diameters of the cable sheaths, thus affording a saving in cost.

I claim:

1. A sealing gland, for use on an elongated body, such as a metal sheathed electric cable, comprising a first tubular surround adapted to surround said body, and formed to provide, between itself and said body, a first clearance open at one end and substantially closed at the other end, packing maetrial within said first clearance, a second tubular surround adapted to surround said body and formed at one end to enter the open end of said first clearance, and also formed to provide, between itself and said body, a second clearance which is open at the other end, a split bushing within said second clearance, means for forcing said first and second tubular surrounds axially relative to each other, whereby said one end of said second tubular surround moves into said first clearance and said packing material is thereby compressed to form a seal around said body, a third surround adapted to surround said body, and means for forcing said third surround and said second tubular surround axially relative to each other, thereby axially compressing said split bushing positively and unyieldingly between the surfaces of the second and third surrounds, and, by cam action, causing it to grip said body.

2. A sealing gland, for use on an elongated body, such as a metal sheathed electric cable, comprising a first tubular surround adapted to surround said body, and formed to provide, between itself and said body, a first clearance open at one end and substantially closed at the other end, packing material within said first clearance, a second tubular surround adapted to surround said body, and formed at one end to screw into the open end of said first clearance and thereby compress said packing material to form a seal around said body, and also formed to provide, between itself and said body a second clearance which is open at the other end, a split bushing within said second clearance, and a third surround adapted to surround said body and to screw into the open end of said second clearance, thereby axially compressing said split bushing positively and unyieldingly between the surfaces of said second and third surrounds, and, by cam action, causing it to grip said body.

3. A sealing gland, for use on an elongated body, such as a metal sheathed electric cable, comprising a first tubular surround adapted to surround said body, and formed to provide, between itself and said body, a first clearance open at one end, packing material within said first clearance, means for compressing said packing material in said first clearance so that it forms a seal around said body, a second tubular surround adapted to surround said body, and formed to provide, between itself and said body, a second clearance open at one end, means coupling said first and second tubular surrounds fast together, a split bushing within said second clearance, a third surround adapted to surround said body, and means for forcing said third surround and said second tubular surround axially relative to each other, thereby axially compressing said split bushing, and, by cam action, causing it to grip said body.

4. A sealing gland, for use on an elongated body, such as a metal sheathed electric cable, comprising a first tubular surround adapted to surround said body, and formed to provide, between itself and said body, a first clearance open at one end and substantially closed at the other end, packing material within said first clearance, a second tubular surround adapted to surround said body, and formed at one end to screw into the open end of said first clearance and thereby compress said packing material, and also formed to provide, between itself and said body a second clearance which is open at the other end, a split bushing within said second clearance, said split bushing being externally coned at both ends, said second tubular surround having an internal coned surface therein which engages the cone at one end of said split bushing, and a third surround adapted to surround said body and to screw into the open end of said second clearance, said third surround having an internal coned surface which engages the cone at the other end of said split bushing, said two internally coned surfaces being unyielding with respect to said second surround and said third surround respectively, whereby the pressure applied to the coned ends of the split bushing is positive.

References Cited in the file of this patent

UNITED STATES PATENTS

| | | |
|---|---|---|
| 2,126,002 | Gardner | Aug. 9, 1938 |
| 2,533,462 | Ingram | Dec. 12, 1950 |

FOREIGN PATENTS

| | | |
|---|---|---|
| 26,124 1910 | Great Britain | Oct. 26, 1911 |